May 25, 1965     D. A. CHRISTENSEN ET AL     3,185,488

FACE SEAL

Filed Nov. 6, 1961                           2 Sheets-Sheet 1

United States Patent Office 3,185,488
Patented May 25, 1965

3,185,488
FACE SEAL
Dan A. Christensen, Woodside, and John H. Bradfute, Santa Clara, Calif., assignors to Federal-Mogul-Bower Bearings, Inc., Detroit, Mich., a corporation of Michigan
Filed Nov. 6, 1961, Ser. No. 150,276
1 Claim. (Cl. 277—42)

This invention relates to improvements in face seals.
Most face seals heretofore known have been complex assemblies of a large number of individual elements. In addition to one or more pairs of sealing faces (each of which may itself be an assembly of several parts), there are usually several springs, a separate bellows to separate the sealed area from the non-sealed area, a separate shaft seal, a separate gasket or other more complicated sealing means for sealing with the bore, and a separate anti-rotation device. This complexity of conventional face seals has increased their cost so much as to preclude their use from many environments where a good seal can only be effected by face seals and also from environments where shaft seals give only marginal performance and face seals are far better. The very number of parts, each individually made, sets a high lower limit to their cost, and the more parts there are the more expensive in their assembly. Moreover, this same complexity is liable to result in addition to tolerances, misassembly, mishandling, and misinstallation, all of which make the seals more prone to failure.

An important object of the present invention is to provide a basically simple type of face seal.

A leading characteristic of the present invention is its use of an elastomeric spring acting largely in shear and partly in compression; moreover, this new spring is integral with and the same element as the bellows. This feature alone greatly simplifies the seal and substantially reduces the number of parts in the whole. Moreover, the elastomeric spring of this invention enables substantially greater deflection than is possible when helical metal springs are used; yet at the same time, the cost of production of these elastomeric springs is substantially less.

The cases of face seals heretofore in use have often been dented when subjected to shock, and their working parts have been worn as they slide or move against other working parts, as a result of vibration. Hence, users have been reluctant to put face seals in environments where they encounter considerable vibration or are liable to shock. The face seals of the present invention are much less sensitive to shock and far less likely to be damaged by vibration. The high hysteresis of elastomeric compositions involved in the seal of this invention tends to damp vibration.

Another important feature of the invention is that it makes it possible to tailor the load deflection curve to the space limitations, force requirements, amount of travel required, and other requirements. The seal can easily be adapted to fit into small available spaces while still having a load-deflection curve approaching the ideal of a constant force at all deflections.

In general, the invention comprises a mechanical seal having two relatively rotating faces, means for non-rotatably securing one of the faces to one portion of the sealed cavity and means for applying force to and firmly attaching the other face. The latter-mentioned means includes two circular stiffening members, one being smaller in diameter than the other, there being a constant radial clearance between them, and an elastomeric compound in that radial clearance connecting the stiffening members and so constructed that when the stiffening members are displaced axially relative to each other the elastomer is stressed mainly in shear.

Other objects and advantages of the invention will appear from the following description of some preferred forms thereof.

Figure 1:
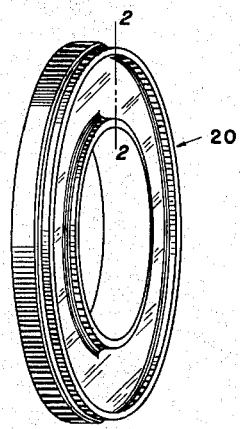
FIG. 1 is a view in perspective of a simple form of face seal component embodying the principles of the present invention.
Figure 2:
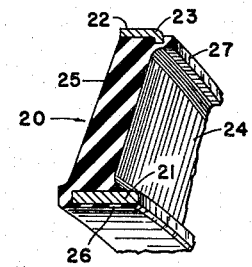
FIG. 2 is an enlarged fragmentary view in elevation and in section taken along the line 2—2 in FIG. 1.

FIGS. 1 and 2 show a unit 20 that may be termed a "shear sandwich." It incorporates an inner peripheral reinforcing member 21 and an outer peripheral reinforcing member 22, both comprising generally cylindrical metal rings. Either or both may be formed from sheet metal and punched or drawn so as to leave a radial end portion 23, which is generally of no functional significance. These two rings 21 and 22 are positioned concentrically about a common axis and there is a constant radial clearance between them. Joining them across this clearance is an elastomeric body 24 of any suitable elastomer bonded at its inner periphery to the inner peripheral member 21, and at its outer periphery to the outer peripheral member 22. As a result, the elastomer is stressed in shear by relative axial movement between the two metal rings 21 and 22. Unlike a clamped construction, the elastomer 24 cannot be lifted off the rings 21 and 22 because it is molded to them; therefore, its movement is mainly in shear, with some minor amount of compression. In the form of device shown in FIGS. 1 and 2, the elastomeric body 24 has a diaphragm portion 25 that is substantially frusto-conical but is somewhat tapered as viewed in section, being thinner at its outer periphery than at its inner periphery. Moreover, the elastomer lies on both sides of the inner ring 21 to provide an elastomeric lining 26 on the inner periphery of the inner ring 21. Adjacent the outer ring 22 and extending out adjacent the portion 23 is a portion 27 which, in this instance, is an integral portion of the elastomeric body 24.

In its normal installation position, the rubber diaphragm 25 has been moved in shear so that it exerts pressure upon the face 27 which is in contact with an end wall (or face) forming part of the housing. The lining 26 fits snugly around a shaft 30 and provides a shaft-sealing gasket as well as holding the inner periphery against axial movement.

Figure 3:
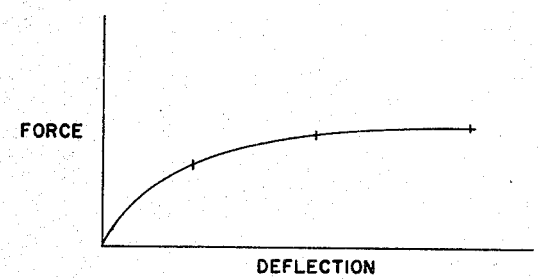
FIG. 3 is a graph showing a load-deflection curve of a typical seal like that of FIG. 1.

The graph in FIG. 3 shows an unusual characteristic in operation of the seal of FIGS. 1–2. The vertical axis indicates the force applied in an axial direction and the horizontal axis indicates the axial deflection resulting from that force. If the seal 20 operated in shear only, this curve would have a constant slope, starting at the origin and going at a constant angle to the axes. If the seal 20 operated only in compression the curve would be more complex, first going up like an arch with an upward sloping part followed by a downward sloping part dropping below the zero line and then curving back up again. The actual curve shown combines some of these features and possibly others. After an initial step portion the curve rises more gradually to what is nearly a plateau and it continues nearly level for a while. This is a remarkable characteristic compared to the nearly linear slope of present face seals.

Figure 4:
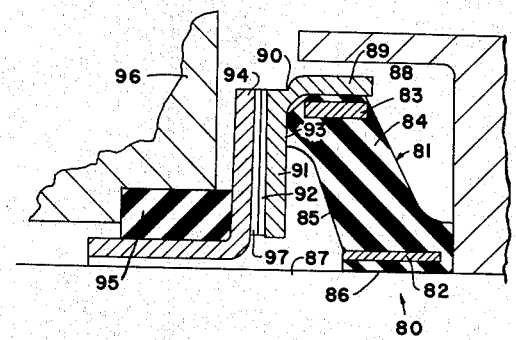
FIG. 4 is a fragmentary view in elevation and in section of a seal embodying the principles of the invention.

A complete shaft seal 80 is shown in FIG. 4. Here there is a shear-sandwich-like member 81 having an inner peripheral reinforcing member 82, an outer reinforcing member 83, and an elastomeric body 84 comprising, among other things, a diaphragm portion 85 which is thinner near the outer periphery than it is near the inner periphery, and encloses both of the metal members 82 and 83 to provide an inner peripheral lining 86 adapted to engage a shaft 87, and an outer peripheral lining 88 which engages a radially inner cylindrical portion 89 of an L-shaped metal member 90. This metal member 90 may be made from sheet metal and has both the cylindrical portion 89 and a radial portion 91. The radial portion 91 may be coated by a suitable hard material such as a ceramic coting 92. The shear member 81 acts as a spring to support this member 90 and also acts as a bellows or diaphragm. It has an end wall 93 engaging the radial wall 92.

The other face element 94 may be an L-shaped sheet metal member having an elastomeric backing member 95 to gasket against a housing 96, and a face sealing coating 97 like the coating 92 and in contact with it.

Figure 5:
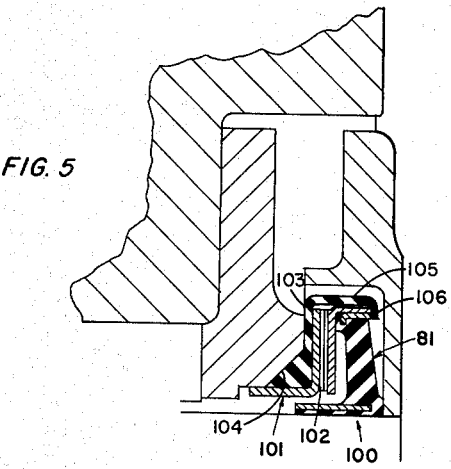
FIG. 5 is a fragmentary view in elevation and in section showing an installation of a modified form of seal.
Figure 6:
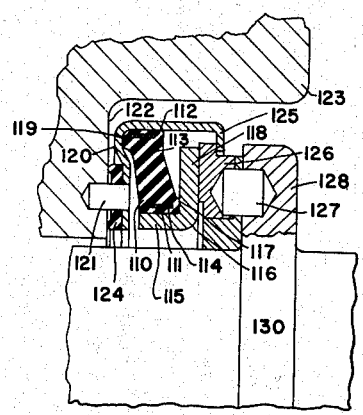
FIG. 6 is a fragmentary view in elevation and in section of an installation embodying another very similar form of seal.

The seal 100 shown in FIG. 5 is similar to the seal 80; in fact, its member 81 is identical. A member 101 like the element 94 has a face coating 102 like the coating 92, but the rubber member 95 is replaced by an elastomeric member 103 serving not only as a gasket against the bore wall 104 but also as a dust cover and unitizing device by virtue of a cylindrical portion 105 having a locking lip 106 holding the element 81 into a unitary package with the member 101. The spring pressure exerted by the rubber diaphragm 85 insures contact in all positions and enables a substantial amount of backward and forward movement.

In another modified form of the invention resembling those just shown a shear sandwich member 110 has an inner peripheral reinforcing member 111, an outer peripheral reinforcing member 112, and an elastomeric body 113. The elastomer-lined inner periphery 114 bears against an axial flange 115 of a face member 116, an axially extending portion 117 of the rubber body 113 bearing against a radially extending portion 118 of the face member 116. The other end 119 of the shear sandwich 110 bears against a case member 120 which is set by torque-lock pins 121 into a shoulder 122 of a bore wall 123, a gasket 124 insuring against leakage at this point. The outer end 125 of the case member 120 unitizes the seal by locking into it an annular face member 126, which is also locked by pins 127 to a flange 128 on the shaft 130. Operation is like that described before with the rubber spring member 113 keeping the face members in tight engagement.

To those skilled in the art to which this invention relates, many additional changes in construction and widely differing embodiments of the invention will suggest themselves without departing from the spirit and scope of the invention as defined in the claim.

What is claimed is:

In a face seal, the combination of:
an inner rigid ring having generally cylindrical inner and outer peripheries,
an outer rigid ring having cylindrical inner and outer peripheries coaxial with said inner ring and displaced axially therefrom,
an elastomeric diaphragm,
means adhesively bonding said diaphragm to both said rings along a substantial axial length so as to have rigidly supported inner and outer peripheries,
said diaphragm providing a frusto-conical web joining said rings for spring-like action resulting when said rings are urged in opposite axial directions, the elastomer in said web then being stressed in shear, and
an annular metal member having an L-shaped cross-section with a cylindrical portion around one said rigid ring and a radial flange against one side of which said web pushes and having a sealing radial end face on the other side of said radial flange backed up by said diaphragm, said rings being embedded in the elastomer of said diaphragms so that there is elastomer on both their inner and outer cylindrical peripheries, one said ring thereby having a lining for engagement with a rotating member, and the other said ring having a lining in engagement with one cylindrical surface of said annular member.

References Cited by the Examiner

UNITED STATES PATENTS

| | | | |
|---|---|---|---|
| 2,289,274 | 7/42 | Krug | 277—42 |
| 2,352,784 | 7/44 | Geyer | 277—90 |
| 2,584,679 | 2/52 | Dobrosavljevic | 277—90 X |
| 2,608,425 | 8/52 | Krug | 277—42 |
| 2,740,648 | 4/56 | Amblard | 277—81 X |
| 2,881,014 | 4/59 | Amirault | 277—90 X |
| 2,911,840 | 11/59 | Muller et al. | 277—42 X |
| 2,916,313 | 12/59 | Ziller et al. | 277—96 X |
| 2,985,475 | 5/61 | Peickii et al. | 277—85 X |

FOREIGN PATENTS

| | | |
|---|---|---|
| 879,496 | 6/53 | Germany. |
| 722,970 | 2/55 | Great Britain. |
| 858,805 | 1/61 | Great Britain. |

LEWIS J. LENNY, *Primary Examiner.*

SAMUEL ROTHBERG, EDWARD V. BENHAM,
*Examiners.*